United States Patent

Okuno et al.

[11] Patent Number: 5,827,113
[45] Date of Patent: Oct. 27, 1998

[54] CUTTING MACHINE

[75] Inventors: Kiyohito Okuno; Sadahiko Itoh; Hisashi Horii, all of Ohtsu, Japan

[73] Assignee: MEMC Electric Materials, Inc., St. Peters, Mo.

[21] Appl. No.: 710,655

[22] Filed: Sep. 20, 1996

[30] Foreign Application Priority Data

Sep. 22, 1995 [JP] Japan ................................. 7-269505

[51] Int. Cl.⁶ ................................ B24B 1/00; B24C 1/00
[52] U.S. Cl. ..................... 451/36; 125/13.02; 125/16.01; 125/23.01
[58] Field of Search ................................. 451/28, 69, 296, 451/171; 125/13.02, 21, 16.01, 16.02, 23.01

[56] References Cited

U.S. PATENT DOCUMENTS

| | | | |
|---|---|---|---|
| 3,831,576 | 8/1974 | Mech | 125/16.01 |
| 4,092,972 | 6/1978 | Scmid | 125/16.01 |
| 4,287,869 | 9/1981 | Schmid | 125/16.01 |
| 4,655,191 | 4/1987 | Wells et al. | 125/16.01 |
| 5,097,637 | 3/1992 | Shepherd | 125/16.02 |
| 5,201,305 | 4/1993 | Takeuchi | 125/16.01 |
| 5,269,285 | 12/1993 | Toyama et al. | 125/16.01 |
| 5,516,327 | 5/1996 | Kawasaki | 451/60 |
| 5,575,705 | 11/1996 | Yam et al. | 451/60 |

FOREIGN PATENT DOCUMENTS

| | | | |
|---|---|---|---|
| 2-152764 | 6/1990 | Japan | 27/6 |
| 6-35107 | 5/1994 | Japan | 27/6 |

*Primary Examiner*—Timothy V. Eley
*Assistant Examiner*—Derris H. Banks
*Attorney, Agent, or Firm*—Senniger, Powers, Leavitt & Roedel

[57] ABSTRACT

A cutting machine includes: groove rollers having guide grooves; wires tensioned by the guide grooves and contacted with a work piece to be cut; and a tank filled with a working fluid and positioned under the wires.

3 Claims, 5 Drawing Sheets

CUTTING MACHINE

BACKGROUND OF THE INVENTION AND RELATED ART STATEMENT

The present invention relates to a cutting machine, and more particularly to a cutting machine to cut blocks of ceramics, glass, silicon, or the like into slices.

In general, a cutting machine for slicing blocks of ceramics, glass, silicon and so on into a plurality of slices includes a number of rollers having a plurality of guide grooves being rotatably mounted on a movable frame so as to be parallel to one another, a plurality of wires mounted on the guide grooves, a work piece holder for setting a work piece in a predetermined position, and an elevating device of the work piece so as to contact it with the wires by moving the movable frame perpendicularly.

In the above prior cutting machine, before contacting the wires with a work piece, working fluid containing abrasive is supplied from an upper side of the wires to adhere on the surface of each of the wires and to be concerned in cutting.

According to the above cutting machine, the working fluid cannot be uniformly adhered on the contact portion of the wire with the work piece, thereby deteriorating cutting precision and efficiency.

To solve the aforementioned problem, Japanese Patent Laid-Open 2-152764 discloses a cutting machine which comprises a tank or container of working fluid mounted on a lift mechanism which also mounts the work piece. Thus, the work piece is held by the lift mechanism immersed in the tank. An additional pair of tanks containing washing fluid are located at each side of the machine. In the cutting machine, wires pass through the walls of the tanks so as to pass through the working fluid and the washing fluid.

According to the above-mentioned cutting machine, the working fluid is equally and fully supplied to the contact portion of the wire and the work piece. However, it is very hard to mount the work piece on the lift mechanism, because the lift mechanism is positioned in the tank containing the working fluid.

Further, very fine slits are required to be formed on the walls of the tanks for the working fluid and the washing fluid to permit the wire to pass through the tank and be immersed in the fluid. The slits must extend below the level of the fluid in the tanks. It is very difficult to form the slits, and it is impossible to prevent leakage of the fluids completely.

SUMMARY OF THE INVENTION

The object of the present invention is to provide a cutting machine in which a work piece can be mounted easily, cutting the work piece is facilitated by a working fluid, the portion where the work piece is cut is promptly and steadily cooled down, and the cutting machine can cope with acceleration of wire speed.

According to the present invention, there is provided a cutting machine comprising: groove rollers having guide grooves; wires tensioned by the guide grooves and contacting a work piece to be cut; and a tank filled with a working fluid and positioned under the wires.

DETAILED DESCRIPTION OF THE PREFERRED EMBODIMENT

Figure 1:
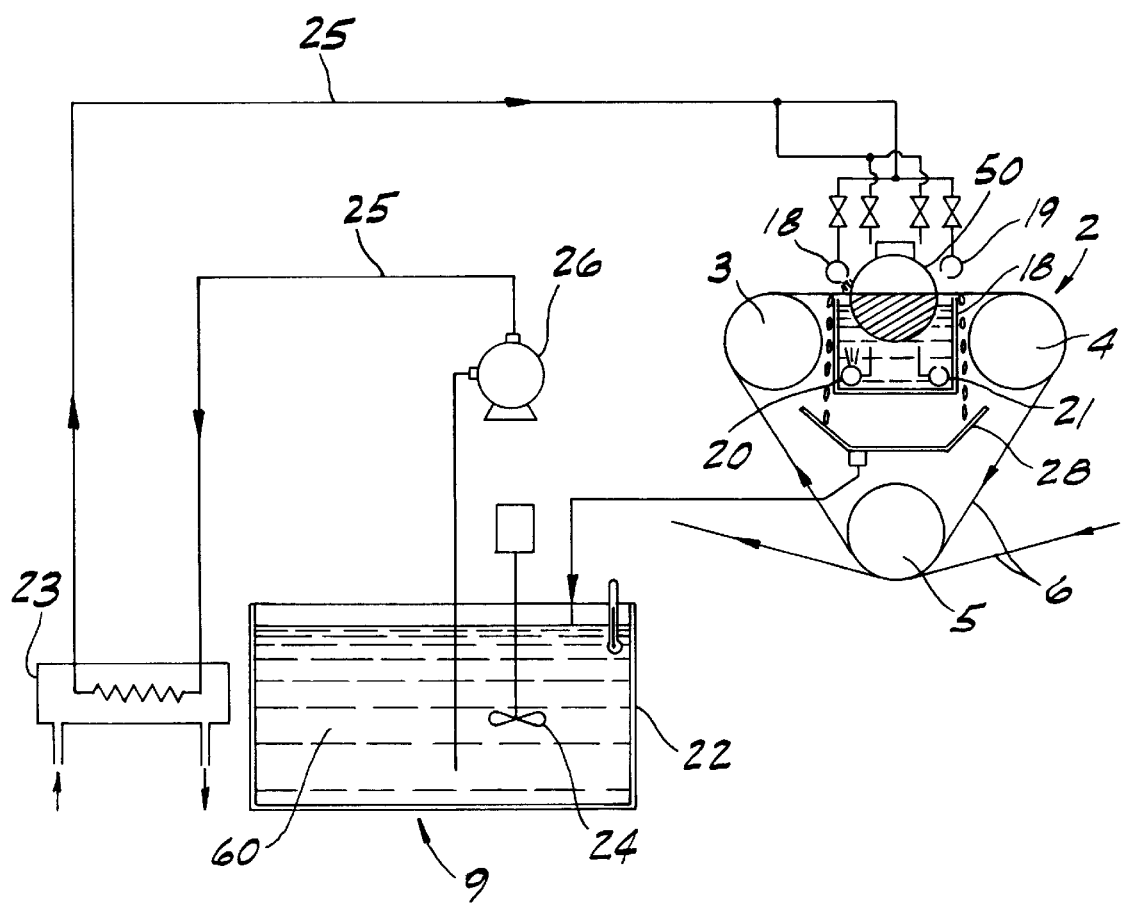
FIG. 1 is a schematic view of an embodiment of a cutting machine of the present invention.
Figure 2:
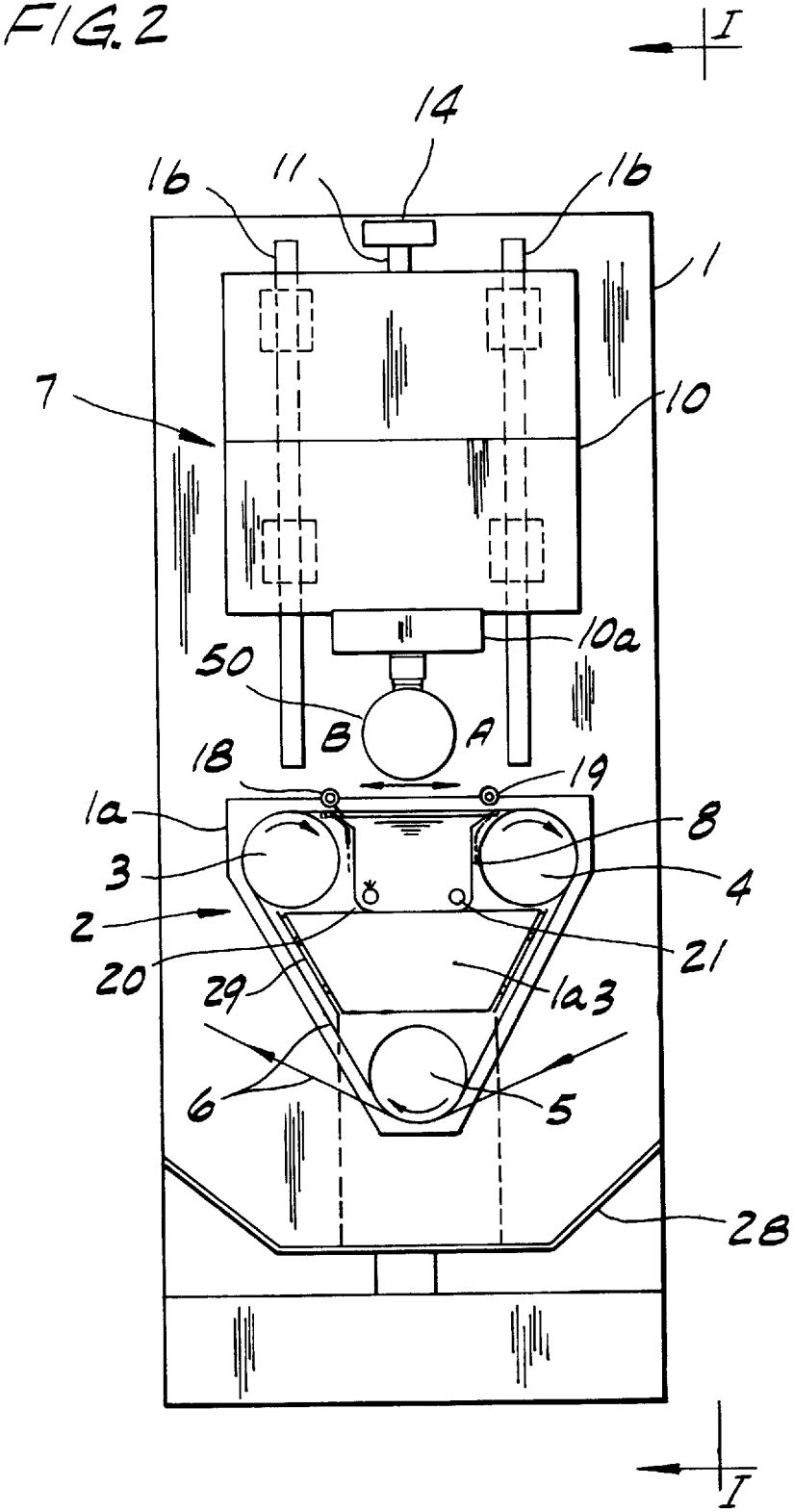
FIG. 2 is an enlarged schematic front elevational view of a cutting mechanism of the cutting machine in FIG. 1.

Referring now to FIGS. 1 and 2, there is illustrated an embodiment of a cutting machine of the invention. The cutting machine includes three grooved rollers 3, 4, and 5 which are rotatably mounted on a frame 1 in parallel. A cutting mechanism 2 includes wires 6 wound on each of the rollers 3, 4, and 5. An elevating device 7 is capable of selectively moving a work piece 50 of ceramics, glass, silicon, or the like, up and down so as to contact the wires 6 in a vertical direction with respect to the frame 1. A container or tank 8 mounted on the frame 1 in a position between the rollers 3, 4, and 5, is supplied with a working fluid by a supplying mechanism 9. The working fluid contains coolant, a mixture of coolant with abrasive, or the like.

The aforementioned rollers 3, 4, and 5 are rotatably mounted on a frame body 1a which is constructed as a unit body of the frame 1 and are arranged in the form of a inverted triangle.

The wire 6 is mounted on a pair of rotary drums (not shown) which are arranged on opposite sides of the cutting mechanism 2. The wire 6 is transferred from one of the drums to the other, passing around the rollers 3, 4, and 5.

Figure 3:
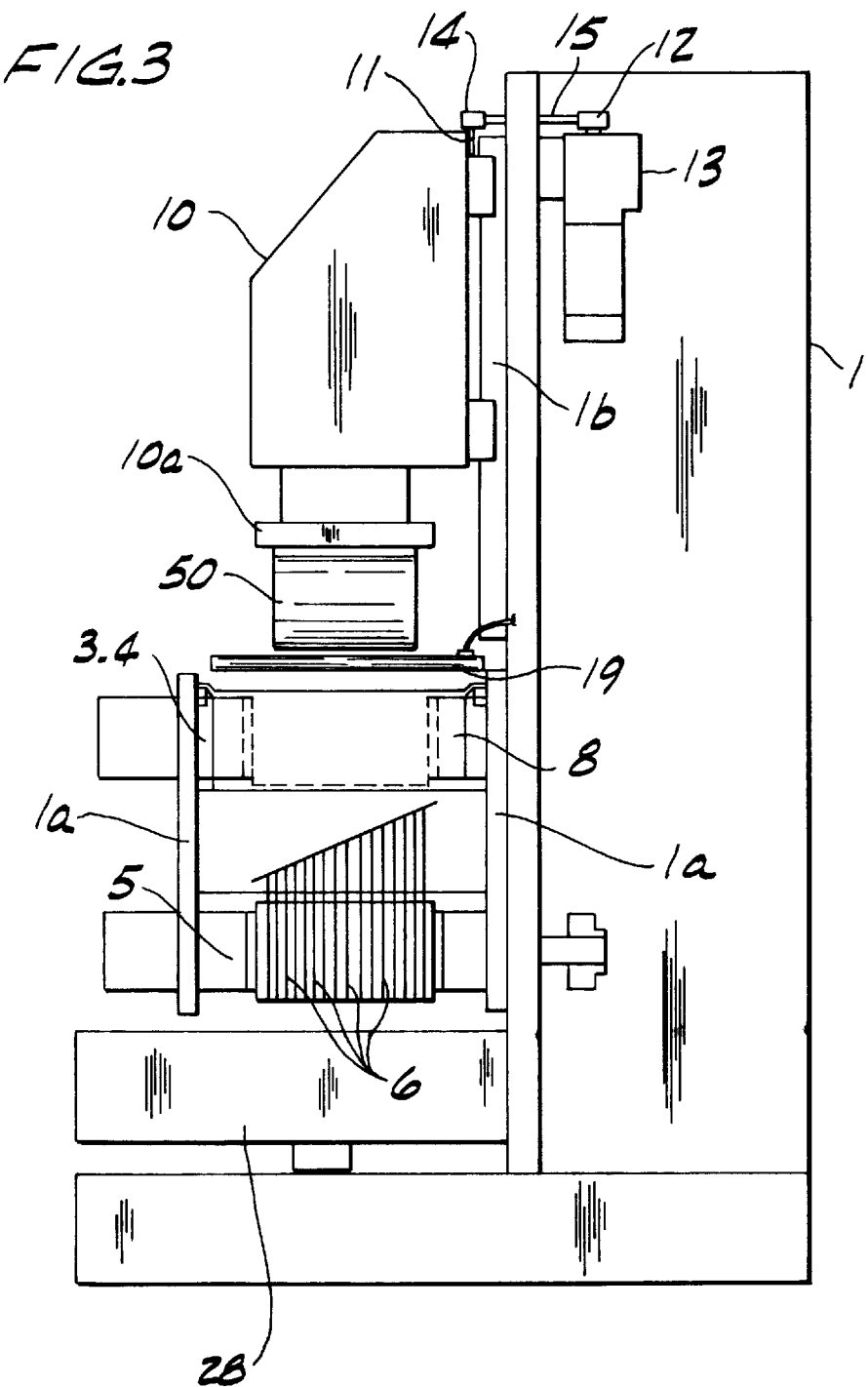
FIG. 3 is a side elevation taken in the direction indicated by line I—I in FIG. 2.

As shown in FIGS. 2 and 3, the elevating device 7 is movably mounted on a guides 1b attached to the frame 1 and includes a movable frame body 10. A screw threaded rod 11 is arranged in a vertical direction with respect to the frame 1 and is supported by bearing means (not shown). A motor 13 is connected to the threaded rod 11 by a pair of sprocket wheels 12 and 14 cooperating with a chain 15. The motor 13 is operable to rotate the screw threaded rod 11 in opposite directions about its longitudinal axis to selectively raise or lower the movable frame body 10.

On the movable frame body 10, a base 10a is constructed to fix a work piece 50 thereon by means of a bolt or the like. The work piece 50 mounted on the base 10a is moved up and down by the rotation of the screw threaded rod 11 driven by the motor 13.

Figure 5:
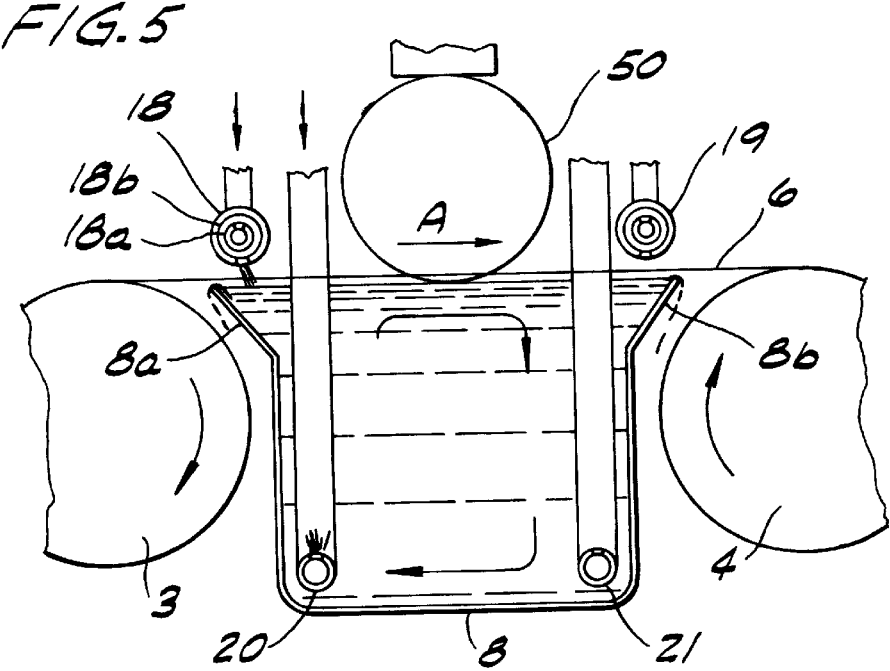
FIG. 5 is a cross-section taken in the plane including line II—II in FIG. 4.

A peripheral wall of the tank 8 has outwardly flaring portions 8a and 8b to permit the wire 6 to contact the working fluid as much as possible (FIG. 5).

Figure 4:
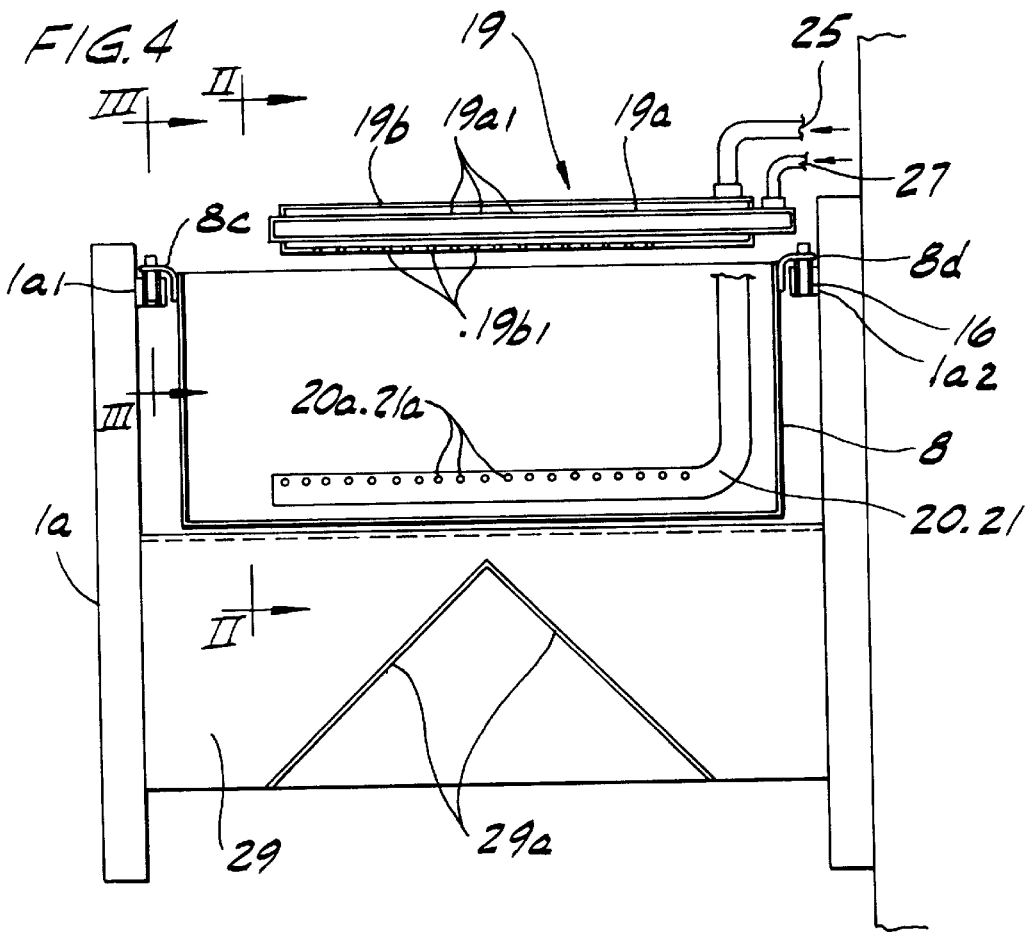
FIG. 4 is an enlarged longitudinal sectional view of a tank of the cutting machine.
Figure 6:
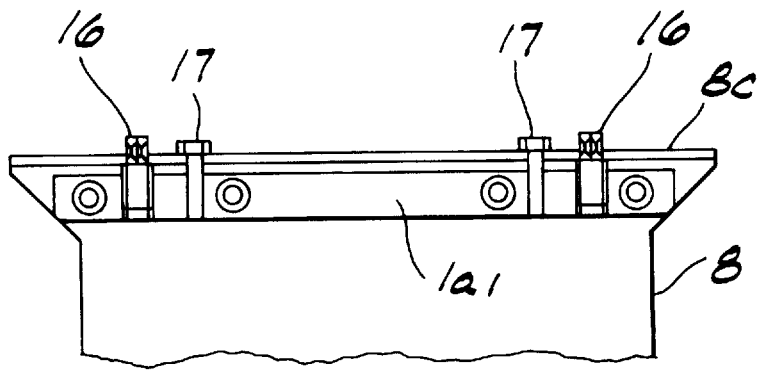
FIG. 6 is a cross-section taken in the plane including line III—III in FIG. 4.

As shown in FIGS. 4 and 6, the tank 8 has front and rear flanges 8c and 8d which are attached to supporting members 1a1 and 1a2 of the frame 1 by adjustable bolts 16. The flanges 8c and 8d are fixed by means of bolts 17 so that the top edge of each of the slanting portions 8a and 8b is parallel to the rollers 3 and 5.

At the upper portion of the tank 8, there are provided first nozzles 18 and 19 which deliver working fluid in jets downwardly into the tank 8. At the bottom of the tank 8, there are provided second nozzles 20 and 21 for supplying the working fluid to the tank 8.

As shown in FIGS. 4 and 5, the first nozzles 18 and 19 are each formed from an inner pipe 18a and 19a provided with small holes (only holes 19a1 being illustrated in the drawings). On a bottom of each of the outer pipes 18b and 19b, there are provided small holes (only holes 19b1 being illustrated in the drawings).

The second nozzles 20 and 21 are also provided with small holes 20a and 21a to emit working fluid.

Referring again to FIG. 1, the aforementioned fluid supplying mechanism 9 includes a reservoir 22 for storing the working fluid 60 of coolant or a mixture of coolant with abrasive therein. A heat exchanger 23 heats and cools the working fluid 60 to a predetermined temperature, and an agitator 24 agitates the working fluid 60. A conduit 25 connected with the inner pipes 18a and 19a of the nozzles 18 and 19 and the nozzles 20 and 21 supplies the working fluid. A pump 26 pumps working fluid 60 from the reservoir 22 to the conduit 25.

The inner pipes 18a and 19a are respectively connected with a compressed air supplying conduit 27 having a valve for adjusting air pressure and a solenoid valve. The working fluid 60 and air mixture is jetted out from the small holes (e.g., holes 19b1) onto the wires 6.

The aforementioned heat exchanger 23 adjusts the temperature of a working fluid 60 passing in the heat exchanger 23 to a predetermined temperature by selectively circulating a cooling medium or a heating medium through the heat exchanger.

The inner pipes 18a and 19a are thus configured to inject air under pressure into the working fluid in the respective outer pipes 18b and 19b.

As shown in FIG. 2, a supporting portion 1a3 of a frame body 1a positioned in the under side of the aforementioned tank 8 has a cross-sectional shape of inverted trapezoid. To the top and the sides of the connecting portion 1a3 is fixed a guide cover 29 which guides run off working fluid to a tray 28 positioned under the groove roller 5. The working fluid overflows out of the container 8, or is transmitted by wires 6 and falls down along groove roller 3 and 4.

The guide cover 29 is provided with a plate 29a having a shape of an inverted V as shown in FIG. 4. The working fluid 60 overflowing out of the container 8 is guided by the plate 29a down into the tray 28. Alternatively, the plate 29a may be directly fixed to the connecting portion 1a3 of a frame body 1a.

A conduit 25 connected with the inner pipes 18a and 19a of the nozzles 18 and 19 and the nozzles 20 and 21 supplies the working fluid. A pump 26 pumps working fluid 60 from the reservoir 22 to the conduit 25.

The following is a description of the cutting operation of a work piece by the aforementioned cutting machine.

First, the work piece 50 is fixedly secured to the base 10a of the movable frame body 10. The wire 6 is moved in a direction A (shown in FIG. 5) by rotating the grooved rollers at a given speed. The working fluid 60 in the reservoir 22 is cooled at a predetermined temperature by the heat exchanger 23 and supplied into the tank 8 through the pipes 20.

When the tank 8 is fully filled with the working fluid 60, it will be circulated within the tank 8 by new working fluid supplied from the pipes 20. The working fluid 60 overflows from the tank 8 over the top ends of the outwardly flaring portions 8a and 8b.

In the aforementioned overflow condition, the surface of the working liquid 60 is 1–3 mm higher than the upper edges of the outwardly flaring portions 8a and 8b of the tank 8. Thus, the wire 6 may contact the working fluid prior to entering the volume defined by the tank 8.

The elevating device is driven by the motor 13 so as to rotate the screw threaded rod 11, and the work piece 50 is moved down together with a movable frame body 10 at a given speed.

Figure 7:
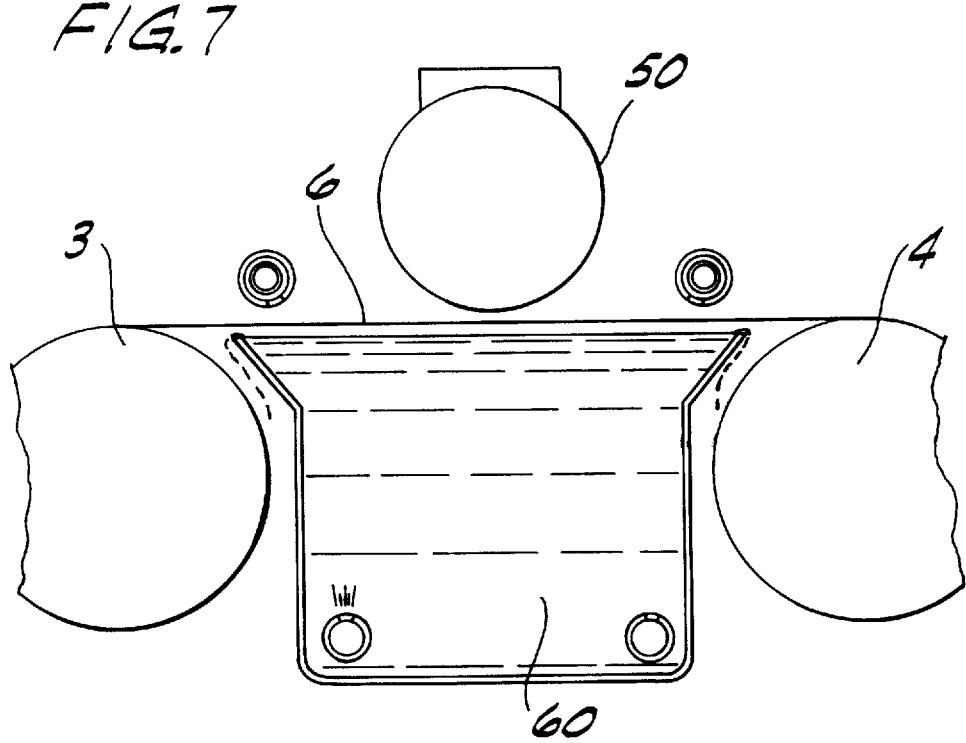
FIG. 7 is a schematic illustration showing the work piece as it approaches the wire of the cutting machine.

As shown in FIG. 7, before the work piece 50 contacts the wires 6, the wires 6 will not contact the working fluid 60.

When the work piece 50 is cut by the wires 6, the wires are deflected downward slightly so that cutting occurs on a portion of the work piece immersed in the working fluid 60. The wires 6 are also deflected downward next to the work piece 50 so that working fluid 60 is applied on the wires prior to making contact with the work piece.

The portion of each of the wires 6 contacting the work piece 50 is in the working fluid. The work piece 50 is cut so that after cutting it has the form of teeth of a comb.

Since the working fluid 60 in the tank 8 forms circular flow moving in the same direction as the wires 6, the working fluid 60 temperature is lowered by new working fluid 60 supplied from the pipes 20 continually supplied to the portion to be cut of the work piece 50. The working fluid 60 in the tank which has a raised temperature overflows from tank 8 out of the slanting portion 8b. The other working fluid 60 returns to the pipes 20 for recirculation.

The overflown working fluid 60 travels along the guide cover 29, is collected in the tray 28, and is returned to the reservoir 22.

When a speed of the aforementioned wires 6 is 1000 m/min. or lower, a predetermined cutting speed can be maintained, and the cut portion can be cooled only by supplying the working fluid 60 from the nozzles 20.

On the other hand, when a speed of the wires 6 is 1000 m/min. or higher, the working fluid 60 tends to be carried along with the wires 6. Therefore, the working fluid 60 is prone to be taken off from the cut portion by the wires 6 and is not sufficiently supplied to the cut portion. This may cause a slow down of the cutting speed or insufficient cooling, resulting in deformation of the slices cut. Accordingly, the working fluid 60 is supplied on the wires 6 from the pipe 18.

A quantity of supply of the working fluid 60 is controlled so as to have a temperature adequate for cooling of the work piece 50.

When the wires 6 move in direction B, the working fluid 60 is required to be supplied from the nozzle 21 to the container 8 and from the nozzle 19 to the wires 6. When a speed of the wires 6 was 2000 m/min., the working fluid 60 was supplied from nozzles 18 and 20 with a rate of 30 l/min. in each pipe. The work piece 50 could be smoothly cut and cooled.

A cutting machine of the present invention is easily retrofit onto a presently existing and installed cutting machine.

A cutting machine of the present invention is provided with a tank filled with a working fluid under wires. Accordingly, when a work piece is not in contact with wires, the wires are not immersed in the working fluid, and when a work piece is in contact with wires, the wires are immersed in the working fluid. Therefore, a work piece can be easily fixed to the cutting machine, and wires can be easily mounted with tension to the groove rollers. Further, cutting of the work piece is facilitated by the working fluid and the cut portion can be promptly and continuously cooled down. Thus, the cutting machine can easily cope with the increase of wire speed.

A cutting machine of the present invention is provided with a fluid supplying mechanism which agitates the working fluid having a predetermined temperature and supplies it to the tank. Such a cutting machine can respond to an increase of temperature of the fluid caused by an increase wire speed and continuously supply working fluid having a low temperature. The fluid supplying mechanism may use nozzles for spraying the working fluid onto the wires and/or nozzles supplying the working fluid to the tank. In such a cutting machine, the tank is always filled with the working fluid by the pipes (20, 21), and the working fluid can always be adhered to the surface of the wires with nozzles (18, 19). Further, the tank can always be filled to overflowing with working fluid by the pipes (20, 21), and the working fluid in the tank can be agitated by the jet action of the working fluid leaving the pipes.

What is claimed is:

1. A method for cutting a work piece using a cutting machine having a wire mounted on rollers for movement of the wire to cut the work piece, the wire including a cutting reach which is positioned for contacting the work piece to cut the work piece, the method comprising the steps of:

providing a container of working fluid having an upper level in the container disposed below, but in closely spaced relation with the cutting reach of the wire;

deflecting at least a portion of the cutting reach of the wires downwardly into immersion within the working fluid by effecting relative movement between the work piece and the wire to bring the work piece into contact with the cutting reach of the wire whereby working fluid is continuously supplied to the work piece where the work piece is being cut by the wire.

2. A method for cutting a work piece as set forth in claim 1 further comprising the step of substantially continuously supplying working fluid to the container to keep working fluid overflowing from the container thereby to maintain the level of working fluid in the container above the upper edges of the container.

3. A method for cutting a work piece as set forth in claim 2 wherein the step of substantially continuously supplying working fluid to the container includes the step of circulating working fluid within the container.

* * * * *